United States Patent
Maguire et al.

(10) Patent No.: US 10,995,678 B2
(45) Date of Patent: May 4, 2021

(54) GAS TURBINE ENGINE WITH DIVERSION PATHWAY AND SEMI-DIMENSIONAL MASS FLOW CONTROL

(71) Applicant: ROLLS-ROYCE plc, London (GB)

(72) Inventors: Alan R. Maguire, Derby (GB); Timothy J. Scanlon, Derby (GB); Luis F. Llano, Derby (GB); Paul A. Sellers, Derby (GB)

(73) Assignee: ROLLS-ROYCE plc, London (GB)

( * ) Notice: Subject to any disclaimer, the term of this patent is extended or adjusted under 35 U.S.C. 154(b) by 170 days.

(21) Appl. No.: 16/044,869

(22) Filed: Jul. 25, 2018

(65) Prior Publication Data

US 2019/0032574 A1    Jan. 31, 2019

(30) Foreign Application Priority Data

Jul. 26, 2017 (GB) .................................... 1712025

(51) Int. Cl.
 *F02C 9/18* (2006.01)
 *F01D 11/24* (2006.01)
 (Continued)

(52) U.S. Cl.
 CPC ................ *F02C 9/18* (2013.01); *F01D 11/24* (2013.01); *F01D 25/24* (2013.01); *F02C 3/04* (2013.01);
 (Continued)

(58) Field of Classification Search
 CPC ...... F02C 9/18; F02C 9/16; F02C 7/18; F02C 7/185; F01D 9/06; F01D 11/14;
 (Continued)

(56) References Cited

U.S. PATENT DOCUMENTS

| | | | |
|---|---|---|---|
| 4,157,010 A * | 6/1979 | Sailer ........................ | F02C 3/10 60/774 |
| 4,311,431 A * | 1/1982 | Barbeau .................. | F01D 5/225 415/116 |

(Continued)

FOREIGN PATENT DOCUMENTS

| | | |
|---|---|---|
| EP | 1806479 | 7/2007 |
| EP | 2604807 A2 | 6/2013 |

(Continued)

OTHER PUBLICATIONS

Great Britain Search Report dated Jan. 9, 2018, issued in GB Patent Application No. 1712025.4.

(Continued)

*Primary Examiner* — Alain Chau
(74) *Attorney, Agent, or Firm* — Shumakers Sieffert, P.A.

(57) ABSTRACT

A gas turbine engine has a core engine including: a compressor, combustion equipment which receives compressed air from the compressor, a circumferential row of nozzle guide vanes, and a turbine. The nozzle guide vanes defines a throat receiving hot working gases from the combustion equipment into the turbine. The gas turbine engine further has an air system which is switchably operable between an on-position which opens a diversion pathway along which a portion of the compressed air exiting the compressor bypasses the combustion equipment to join the hot working gases at re-entry holes located between the nozzle guide vanes and a rotor at the front of the turbine, thereby increasing the semi-dimensional mass flow $\omega(T30)^{0.5}/(P30)$ of the core engine at the exit of the compressor, and an off-position which closes the diversion pathway, thereby decreasing the semi-dimensional mass flow of the core engine at the exit of the compressor.

16 Claims, 7 Drawing Sheets

(51) Int. Cl.
  *F02K 3/075* (2006.01)
  *F02C 7/18* (2006.01)
  *F01D 25/24* (2006.01)
  *F02C 3/04* (2006.01)
  *F01D 25/12* (2006.01)
  *F02K 3/06* (2006.01)

(52) U.S. Cl.
  CPC ............ *F02C 7/18* (2013.01); *F02K 3/075* (2013.01); *F01D 25/12* (2013.01); *F02K 3/06* (2013.01); *F05D 2220/32* (2013.01); *F05D 2220/3212* (2013.01); *F05D 2240/122* (2013.01); *F05D 2270/306* (2013.01); *F05D 2270/3062* (2013.01)

(58) Field of Classification Search
  CPC .......... F01D 11/24; F01D 25/08; F01D 25/12; F01D 25/24; F05D 2240/122; F05D 2240/81; F05D 2220/3212; F05D 2270/3061; F05D 2270/3062; F05D 2270/306
  See application file for complete search history.

(56) References Cited

U.S. PATENT DOCUMENTS

| | | | | |
|---|---|---|---|---|
| 4,448,019 | A * | 5/1984 | Klees | F02C 9/18 60/204 |
| 4,522,557 | A * | 6/1985 | Bouiller | F01D 11/10 415/115 |
| 4,596,116 | A * | 6/1986 | Mandet | F01D 11/24 60/785 |
| 4,928,240 | A * | 5/1990 | Davison | F01D 11/24 415/116 |
| 5,048,288 | A * | 9/1991 | Bessette | F01D 11/24 415/116 |
| 5,169,287 | A * | 12/1992 | Proctor | F01D 5/182 415/115 |
| 5,584,651 | A * | 12/1996 | Pietraszkiewicz | F01D 11/08 415/115 |
| 5,993,150 | A * | 11/1999 | Liotta | F01D 11/10 415/115 |
| 6,139,257 | A * | 10/2000 | Proctor | F01D 9/04 415/115 |
| 6,615,574 | B1 * | 9/2003 | Marks | F02C 7/18 60/772 |
| 7,096,673 | B2 * | 8/2006 | Little | F01D 5/081 60/782 |
| 7,246,989 | B2 * | 7/2007 | Glasspoole | F01D 11/24 415/1 |
| 7,334,985 | B2 * | 2/2008 | Lutjen | F01D 11/24 415/173.1 |
| 7,520,719 | B2 * | 4/2009 | Janke | F01D 11/08 415/176 |
| 7,785,067 | B2 * | 8/2010 | Lee | F01D 11/24 415/173.1 |
| 8,015,826 | B2 * | 9/2011 | Myers | F02C 9/18 60/785 |
| 8,490,379 | B2 * | 7/2013 | Nomura | F02C 9/54 60/39.281 |
| 9,410,435 | B2 * | 8/2016 | Xu | F01D 9/065 |
| 2003/0002979 | A1 | 1/2003 | Koschier | |
| 2005/0109016 | A1 * | 5/2005 | Ullyott | F01D 11/24 60/282 |
| 2005/0126181 | A1 * | 6/2005 | Wilson | F01D 11/24 60/785 |
| 2006/0123794 | A1 * | 6/2006 | Glasspoole | F01D 11/24 60/772 |
| 2007/0081890 | A1 * | 4/2007 | Lutjen | F01D 11/24 415/115 |
| 2008/0112797 | A1 * | 5/2008 | Seitzer | F01D 11/24 415/116 |
| 2008/0112798 | A1 * | 5/2008 | Seitzer | F01D 11/24 415/144 |
| 2009/0056342 | A1 * | 3/2009 | Kirzhner | F01D 25/12 60/772 |
| 2010/0251727 | A1 * | 10/2010 | Myers | F02C 9/18 60/773 |
| 2010/0281879 | A1 * | 11/2010 | Shapiro | F01D 5/08 60/782 |
| 2011/0027068 | A1 * | 2/2011 | Floyd, II | F01D 11/24 415/13 |
| 2013/0036747 | A1 | 2/2013 | Fuchs et al. | |
| 2013/0152601 | A1 * | 6/2013 | Bacic | F01D 11/24 60/782 |
| 2013/0209227 | A1 * | 8/2013 | Xu | F01D 5/186 415/115 |
| 2015/0033729 | A1 | 2/2015 | Bourassa et al. | |
| 2015/0322865 | A1 | 11/2015 | Scipio et al. | |
| 2017/0138211 | A1 * | 5/2017 | Fukui | F01D 11/08 |
| 2017/0167273 | A1 | 6/2017 | Maguire et al. | |

FOREIGN PATENT DOCUMENTS

| | | |
|---|---|---|
| EP | 2740903 A2 | 6/2014 |
| EP | 3133246 A1 | 2/2017 |
| EP | 3181829 A1 | 6/2017 |

OTHER PUBLICATIONS

Extended European Search Report from counterpart EP Application No. 18184461.4, dated Dec. 7, 2018, 8 pgs.
Response to the Extended European Search Report from counterpart EP Application No. 18184461.4, dated Dec. 7, 2018, filed Jul. 23, 2019, 31 pgs.

* cited by examiner

GAS TURBINE ENGINE WITH DIVERSION PATHWAY AND SEMI-DIMENSIONAL MASS FLOW CONTROL

CROSS-REFERENCE TO RELATED APPLICATIONS

This application is based upon and claims the benefit of priority from British Patent Application No. GB 1712025.4, filed on 26 Jul. 2017, the entire contents of which are herein incorporated by reference.

BACKGROUND

Technical Field

The present disclosure relates to a gas turbine engine having an air system which is operable to vary the semi-dimensional mass flow of the core engine.

Description of the Related Art

Aero gas turbine engines have contradictory requirements in respect of their need to provide high take-off and climb thrust (and as a consequence undesirably high operating temperatures and shaft speeds) and a typical desire for high thermal efficiency during lower powered cruise operations.

This conflicting set of requirements is particularly acute in thermodynamic cycle design of large civil aero engines, where cruise efficiency is paramount, and in military fighter engines, where the relative difference between high power and cruise thrust settings is even more extreme. However, the problem of reconciling contradictory requirements is also applicable to small and medium civil aero engines and turbo-props, although generally to a lesser degree.

It is known to bleed compressed air from a gas turbine engine compressor in order to provide pressure to the aircraft cabin by supplying air to the environmental control system. Additionally, bleed air can be used to keep critical parts of the plane (such as the wing leading edges) ice-free. Further uses of bleed air are to increase air flow through the compressor, increasing compressor surge margin, and for engine component cooling purposes.

SUMMARY

It would be desirable to be able to vary the core mass flow of a gas turbine engine in order to suit engine operating conditions.

Accordingly, the present disclosure provides a gas turbine engine having a core engine including: a compressor, combustion equipment which receives compressed air from the compressor, a circumferential row of nozzle guide vanes, and a turbine, the nozzle guide vanes defining a throat for entry of hot working gases from the combustion equipment into the turbine; and the gas turbine engine further having an air system which is switchably operable between an on-position which opens a diversion pathway along which a portion of the compressed air exiting the compressor (i.e. compressor delivery air) bypasses the combustion equipment to join the hot working gases at re-entry holes located between the nozzle guide vanes and a rotor at the front of the turbine, thereby increasing the semi-dimensional mass flow $\omega(T30)^{0.5}/(P30)$ of the core engine at the exit of the compressor, and an off-position which closes the diversion pathway, thereby decreasing the semi-dimensional mass flow of the core engine at the exit of the compressor, w being the real mass flow of the compressed air exiting the compressor, T30 being the temperature of the compressed air exiting the compressor, and P30 being the pressure of the compressed air exiting the compressor; wherein the air system is configured such that said portion of the compressed air is at least 2% of the total compressed air exiting the compressor.

Thus, rather than just bleeding air from the compressor to increase air flow through the compressor, the diverted portion of the compressed air, by being used in a more focused way to vary the compressor exit semi-dimensional mass flow, can help to reconcile the conflicting operational requirements imposed upon the engine.

More particularly, the engine's core size is related to the compressor exit semi-dimensional mass flow. The air system allows the core turbine expansion ratio to be changed and therefore the turbine specific power. This enables control of the compressor exit temperature and pressure, i.e. the engine's overall pressure ratio (OPR). By controlling the engine's OPR across flight conditions, engine performance can be optimised. The system also enables control of the turbine inlet temperature traverse, helping to make it flatter at cruise conditions for thermal efficiency. Relative to an engine without such an air system, the engine of the present disclosure can be configured with a reduced area for the throat defined by the nozzle guide vanes. This can provide an increase in engine overall pressure ratio and hence improved fuel burn during lower powered cruise operations when the air system is switched to its off-position. During high power operations, such as take-off and climb, the air system can be switched to its on-position to provide an effective increase in core engine size and thus protect engine components from excessively high temperatures and shaft speeds.

The air system may be switched between its on-position and its off-position to best suit the engine at off-design conditions, such as descent idle and ground idle, to improve compressor operability margins. As a consequence, the compressor may advantageously be designed with reduced levels of surge margin to provide improved overall thermal efficiency. In general, margins in a high pressure compressor increase with the air system in its on-position, while margins in an intermediate pressure compressor increase with the air system in its off-position.

In addition, when the air system is switched to its on-position, the diverted portion of the compressed air provides a cooling effect that can enable reductions in other cooling flows to, for example, the rear outer discharge nozzle (typically formed by a sealing ring which bridges a gap between a radially outer end wall of the combustion equipment and an outer platform of the nozzle guide vanes), nozzle guide vanes (e.g. due to a flatter temperature traverse), turbine seal segments, and rotor blades. Moreover, when the air system is switched to its off-position, the engine is typically in lower power operating conditions which require less cooling flows. Thus the air system can significantly reduce the need for cooling flows, with any cooling flows that are extracted being used more efficiently and thereby improving overall engine efficiency.

The amounts of time that the air system spends in its on and off-positions may be varied throughout the engine's life as the engine deteriorates. For example, it may be that the compressor exit temperature and shaft speed reduce as the engine deteriorates due to turbine deterioration. In this case, it may be beneficial to switch the system off during engine maximum take-off thrust conditions to improve engine thermal efficiency and reduce core turbine temperatures.

The gas turbine engine may have any one or, to the extent that they are compatible, any combination of the following optional features.

The compressor may be a high pressure compressor of the engine. A three shaft engine may also have a fan and an intermediate pressure compressor. A two shaft engine may also have a fan and optionally a low pressure compressor.

The turbine may be a single stage turbine (in which case the rotor at the front of the turbine is the only rotor of the turbine) or a multi-stage turbine. The turbine may be a high pressure turbine of the engine. A three shaft engine may also have an intermediate pressure turbine and a low pressure turbine. A two shaft engine may also have just a low pressure turbine.

Said portion of the compressed air may be at least 3% or at least 5% or at least 6% of the total compressor delivery air. Said portion of the compressed air may be up to 10% or up to 15% or up to 20% of the total compressor delivery air. In a large civil gas turbine engine, when said portion is about 5%, it can provide improvements in specific fuel consumption of about 0.5%.

The re-entry holes can be formed in an outer wall of the hot working gas annulus, in an inner wall of the hot working gas annulus and/or in the trailing edges of the nozzle guide vanes. In general, however, it is convenient to form the re-entry holes in the outer wall of the hot working gas annulus. For example, the re-entry holes may be located at the trailing edges of outer platforms of the nozzle guide vanes. Another option is to locate the re-entry holes at the leading edge of seal segments providing tip clearance control for the front rotor of the turbine.

The air system may further have fan-shaped accelerating flow ducts for said portion of the compressed air, the re-entry holes being exit holes from the flow ducts. In this way, the air joining the hot working gases at the re-entry holes can be provided with a high velocity and be evenly distributed.

The diversion pathway may be configured such that, at the re-entry holes said portion of the compressed air is given a swirl component that matches the swirl component of the hot working gases flowing across the re-entry holes. This helps to reduce losses. A large range of exit swirl angles, e.g. from 0° to 80°, is possible.

The air system may be configured such that, in the off-position, a purge flow of air is directed through the re-entry holes to prevent hot working gas ingestion therethrough. For example, the purge flow can be formed from a further (typically smaller) portion of the compressor delivery air and diverted to bypass the combustion equipment.

The core engine typically further includes a radially outer air casing to the combustion equipment. Said portion of the compressed air may be extracted onto the diversion pathway adjacent the compressor exit. Another option, however, is for said portion of the compressed air to be extracted onto the diversion pathway from the passage formed between radially outer air casing and the combustion equipment.

The diversion pathway may remain inside the radially outer air casing. This can provide weight and space benefits. Moreover, advantageously larger mass flows can be handled than if external piping is used. However, particularly if space is restricted inside such an air casing, another option is for the diversion pathway to extend between the compressor exit and the nozzle guide vanes via piping external to the core engine.

The diversion pathway may pass through an annular plenum upstream of the re-entry holes. The plenum conveniently provides a location to collect the air on the pathway before distributing it to the re-entry holes. The plenum can also provide a tip clearance control mechanism. In particular, when relatively hot air is supplied to the plenum it causes heat transfer into the adjacent, radially outer engine casing, which expands relatively rapidly thereby increasing the tip clearance, or keeping pace with the blade growth, at rapid engine transients. Advantageously the air system acts at engine operating conditions when this tip clearance effect is beneficial.

The air system may have one or more valves operable to open or close the diversion pathway. For example, the valves can be binary operating valves such as plug or poppet valves, or vortex amplifier valves, they can be continuously variable valves such as rotating gate valves or butterfly flap valves. The valves may be located on the diversion pathway upstream of the re-entry holes. Conveniently, in the case when the diversion pathway passes through an annular plenum upstream of the re-entry holes, the one or more valves may be operable to permit or prevent access to the plenum by said portion of the compressed air. When the system has plural such valves, just subsets thereof can be actuated to provide reduced air system operation.

The engine may further have an engine electronic controller, and the valves may be actively controllable by the controller to switch the air system. For example, the engine electronic controller may be configured to open the diversion pathway during take-off and climb operating conditions, and to close the diversion pathway during cruise operating conditions. Additionally, the controller may be configured to open the diversion pathway during descent idle and/or ground idle operating conditions. More generally, the engine electronic controller may control operation of the air system by engine power setting parameters. The controller can use such data to determine the most optimum position of the air system for a given flight condition and then directs the valve activation accordingly.

Alternatively, instead of actively controllable valves, the valves may be configured such that they are passively operable. For example, the valves may be operatively connected to the nozzle guide vanes such that tilting of the nozzle guide vanes caused by differential thermomechanical movement between inner and outer casings of the core engine operates the valves. As another example, the valves can be configured to open when the compressor exit pressure exceeds a predetermined level, e.g. in the manner of a pressure relief valve.

BRIEF DESCRIPTION OF THE DRAWINGS

Embodiments of the present disclosure will now be described by way of example with reference to the accompanying drawings in which.

DETAILED DESCRIPTION

Figure 1:
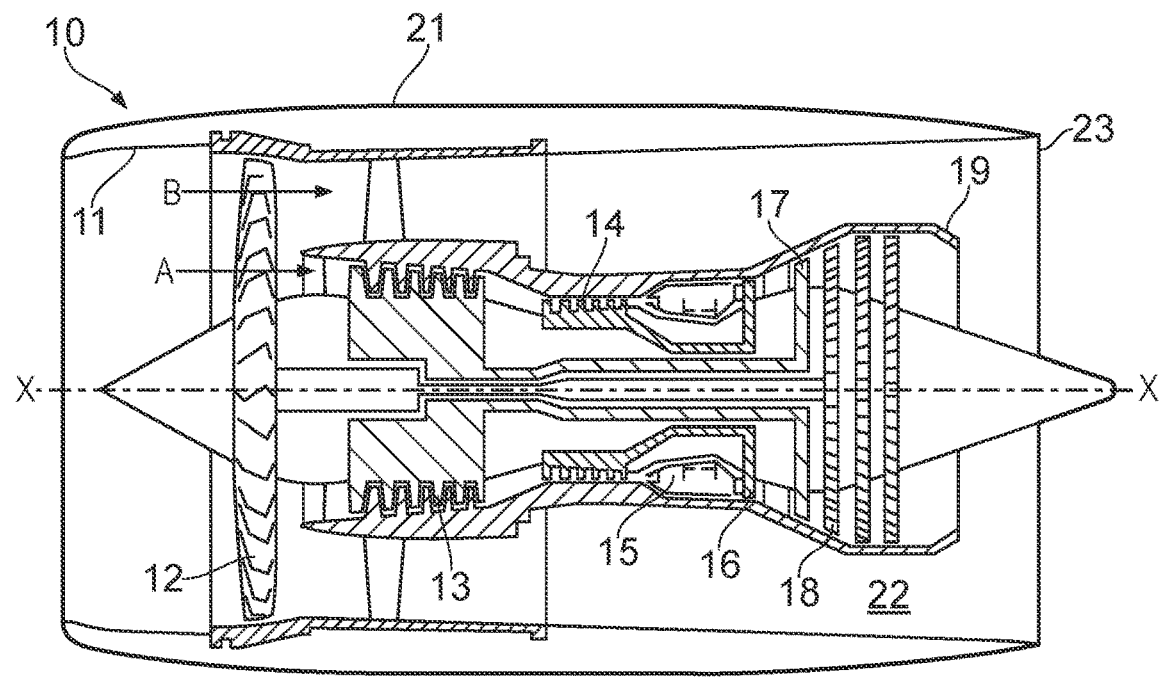
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive the high, intermediate and low pressure turbines 16, 17, 18 before being exhausted through the nozzle 19 to provide additional propulsive thrust. The high, intermediate and low pressure turbines respectively drive the high and intermediate pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
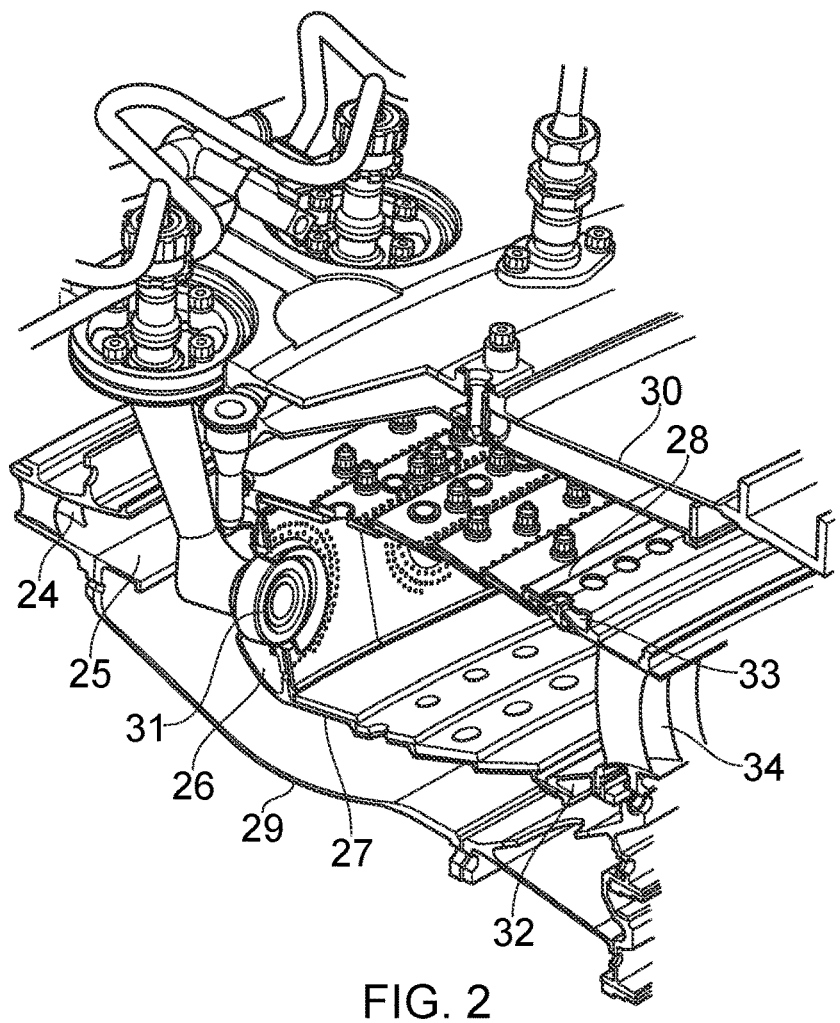
FIG. 2 shows a section through combustion equipment of the engine of FIG. 1.

FIG. 2 shows in more detail the combustion equipment 15 of the engine 10. The compressed air from the high pressure compressor 14 arrives at an annular combustion chamber via a row high pressure outlet guide vanes 24 and a diffuser 25. The combustion chamber has a chamber head 26, an inner combustion liner 27, an outer combustion liner 28, and is located between an inner air casing 29 and an outer air casing 30. The compressed air flows around the combustion chamber and enters therein through holes in the liners. A row of airspray nozzles 31 provides fuel for the combustion chamber. The hot combustion gases leave the combustion chamber between a rear inner discharge nozzle 32 and a rear outer discharge nozzle 33, and flow through a throat defined by a row of nozzle guide vanes (NGVs) 34. They then continue on to a row of rotor blades (not shown in FIG. 2) forming the front of the high pressure turbine 16.

Missing from FIG. 2 are details of an air system for varying the semi-dimensional mass flow of the core engine. This system is shown in the longitudinal cross section at the left hand side FIG. 3.

The air system provides a switchable arrangement by which a proportion of high pressure compressor (HPC) delivery air flow may be directed to bypass the NGVs 34, re-joining the hot working gases between the NGVs and the blades 35 of the rotor at the front of the high pressure turbine. Switching the bypass flow on effectively increases the engine core size and switching it off reverses the increase.

The air system includes an annular master plenum chamber 36 arranged with plural (typically two to five) switching plug (poppet) valves 37 which control entry of HPC delivery air from the space between the outer combustion liner 28 and the outer air casing 30 into the plenum chamber. Opening the plug valves forms a diversion pathway for a controlled portion of the HPC delivery air to flow via the master plenum chamber to individual plenum chambers 38 provided inside the outer platforms of pairs of NGVs 34 (noting that in other engines the NGVs can be arranged as singles, triplets etc.). More particularly, transfer of bypass air from the master plenum chamber to the NGV plenum chambers can be through transfer pipes 39 with sliding piston seals to allow relative movement between the NGVs and the annular master plenum chamber. A further W-seal 40 can limit the amount of leakage air into the master plenum chamber.

Figure 3:
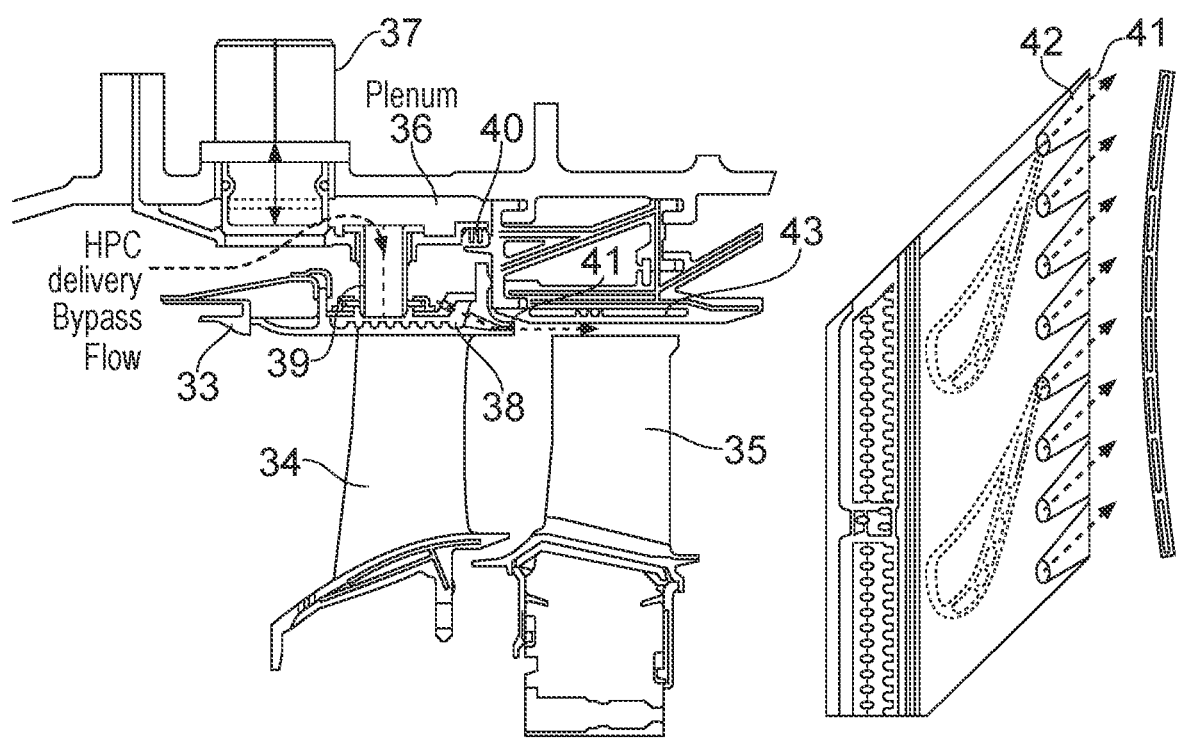
FIG. 3 provides at left a longitudinal cross-section showing an air system of the core engine of FIG. 1, and at right an equal radius cross-section of an outer platform of a pair of nozzle guide vanes.

As shown in the right hand side of FIG. 3, the bypass air exits the plenum chambers 38 in a controlled manner through a line of re-entry holes 41 along the trailing edge of each NGV outer platform. This arrangement helps to reduce aerodynamic losses that would otherwise deteriorate the efficiency of the high pressure turbine 16. Fan-shaped accelerating ducts 42 receive the bypass air from the plenum chambers 38, the re-entry holes 41 being slot-shaped holes at the exits of the ducts. The ducts provide the bypass air with high and evenly distributed velocity that also has a swirl component matched to that of the NGV throat swirl. However, if exact swirl component matching is not achievable, it is generally beneficial at least to reduce the mismatch as far as possible. Also preferably mis-match in radial component is eliminated or reduced as far as possible. A typical area ratio between the holes through which the ducts receive the bypass air and the re-entry holes 41 is 2:1. However, other area ratios and/or re-entry hole shapes are possible. If necessary the ducts can contain respective aerofoil members to provide even higher amounts of swirl.

A conventional arrangement for cooling the outer platforms of NGVs would be to inject air from within the outer air casing to the leading edges of the NGV aerofoils, towards their radially outer ends. This cooling flow would then typically mix with the main flow across the NGVs, and so have little cooling effect on downstream blades or seal segments. In addition it could promote a non-uniform radial temperature traverse at the NGV leading edges. By contrast, the process of distributing the bypass air around the NGV outer platforms using the air system of the present disclosure provides an enhanced cooling environment for the platforms. In particular, the individual plenum chambers 38 provide more effective cooling of the NGV platforms than conventional arrangements. This in turn allows a significant reduction in the level of cooling flow required for the rear outer discharge nozzle 33, which can help to reduce spoiling effects into the high pressure turbine rotor blades 35 and can provide a flatter (more efficient) radial temperature traverse since no cooling air injection upstream the NGVs 34 is required.

Optionally some of the bypass air can be routed from the chambers 38 through the NGVs 34 to reach and cool the inner platforms of the NGVs.

The re-introduced air is directed along the outer annulus wall of the high pressure turbine 16 in front of the blades 35 and also provides cooling air flow to high pressure turbine seal segments 43 and blade tips during high power conditions. Cooling requirements in these locations are much less arduous during cruise conditions (when the plug valves 37 are closed to shut off the diversion pathway), thus the overall amount of seal segment and rotor tip cooling air may be reduced down from conventional levels when the bypass air is "off".

Figure 4:
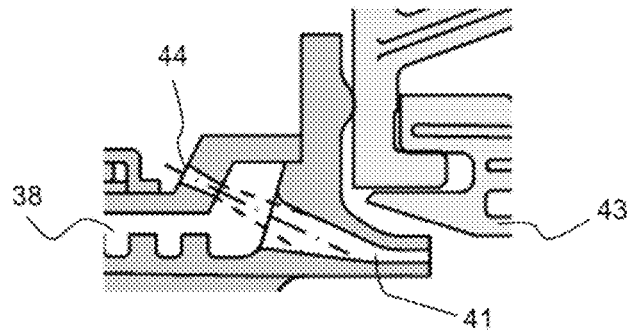
FIG. 4 shows a close-up view of the trailing edge of a nozzle guide vane outer platform.

The air system can include re-ingestion protection for the re-entry holes 41. FIG. 4 shows a close-up view of the trailing edge of the NGV outer platform. Ejector protector holes 44 formed in the top wall of the NGV outer platform provide a small continuous flow of purge air directly into the re-entry holes 41 to maintain a positive flow direction when the bypass flow is switched off. This purge flow derives directly from the HPC delivery air in the space between the outer combustion liner 28 and the outer air casing 30, and is separate from the bypass flow through the valves 37 and master plenum chamber 36 when the air system is switched on. The purge flow may amount to no more than about 0.5% of the HPC delivery air.

The air system is used to modulate the semi-dimensional mass flow of the core engine at the exit of the high pressure compressor 14, i.e. to modulate the engine core size. The valves 37 allow the bypass flow to be switched on or off at any power setting condition of the engine, and therefore allow core size modulation at any power setting. Furthermore, the valves may be switched either as one entity or sequentially switched to provide stepped modulation.

The ability to modulate the engine core size by varying the bypass flow allows the throat defined by the NGVs 34 to be reduced, enabling an increased overall engine pressure ratio (and enhanced engine performance) during low power operations such as cruise. The amount by which the throat area can be reduced relative to an engine without the air system is approximately equivalent to the amount of bypass air during high power operations. At least 2% of the HPC delivery flow may be diverted, and preferably at least 3% or 5%. Such values can lead to improvements in specific fuel consumption of about 0.5%. However, the level of performance improvement tends to increase with increasing levels of bypass flow. Accordingly, bypass flows of up to 10% or 15% of HPC delivery flow may be envisaged with the system.

The air system enables the engine thermodynamic cycle to be designed with higher overall pressure ratio, flatter combustor exit traverse, lower cooling flow consumption, and hence higher engine efficiency during cruise operation, with only a small increase (approx. 2 degrees K) in cycle temperatures and shaft speeds during high power conditions.

When switched on, the air system improves compressor operability (surge margin) at low power conditions (ground idle, descent idle) without incurring the noise and reduced efficiency associated with conventional bleed valve systems. A secondary benefit of the air system when used (switched on) during ground idle conditions is to reduce ground idle thrust and hence improve aircraft brake wear.

The following Table 1 shows how the air system may be utilised:

TABLE 1

| Engine Operating Condition | Air system bypass flow |
| --- | --- |
| Take Off | On |
| Cruise | Off |
| Climb | On at start of climb, gradually closing towards end of climb |
| Idle (ground/flight) | Fully or Partially On - depending on compressor handling requirements |

The air system can also accommodate the following transient and emergency operating conditions:
- Transient Operation—switching the air system on during transient operations enables a degree of control over the magnitude of temperature and speed excursions.
- Emergency Thrust Response—switching the air system on during emergency thrust operations improves engine slam acceleration reaction times.
- Engine Starting—switching the air system on during engine starting reduces engine start times in a similar manner to conventional compressor handling bleed valves.

Figure 5:
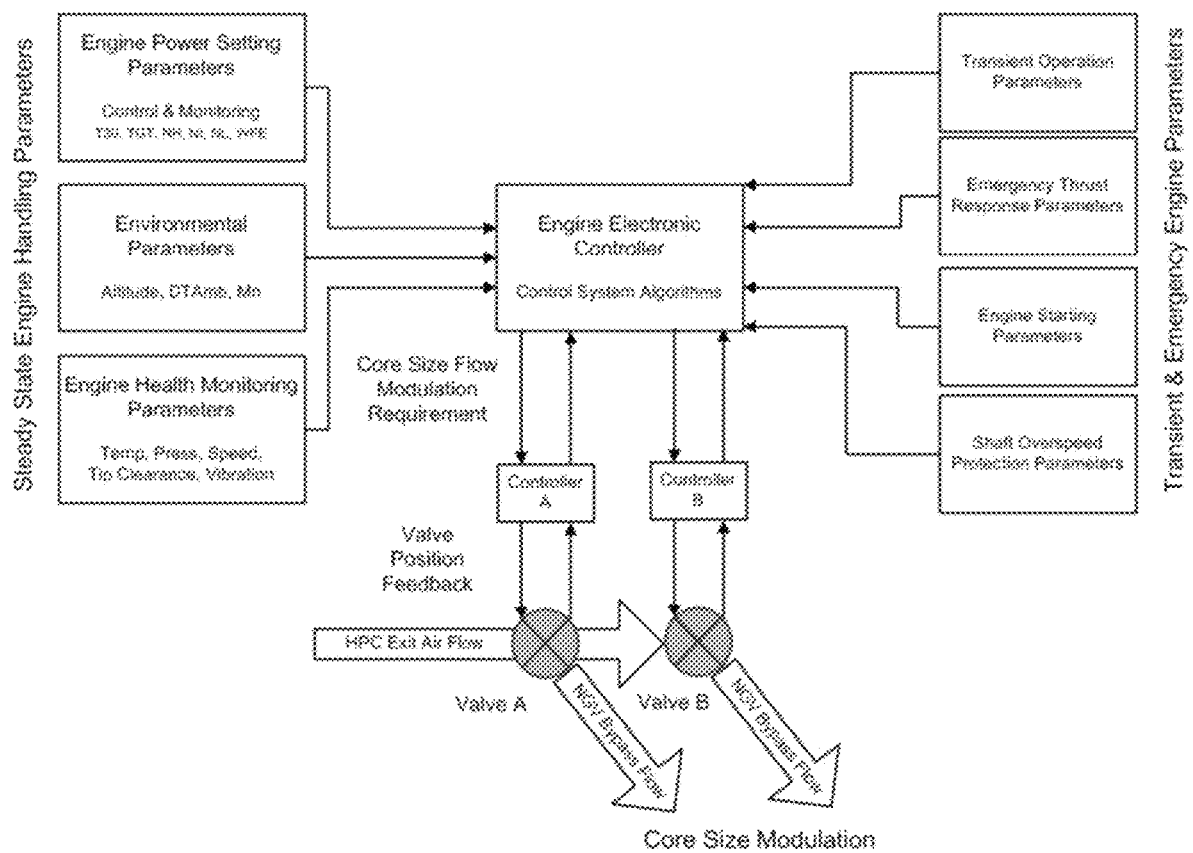
FIG. 5 shows schematically an overview of a control system.

Operation of the air system may be primarily controlled by an engine electronic controller (EEC) via engine power setting parameters (HPC delivery temperature—T30; turbine gas temperature—TGT; shaft speeds—NH, NI, NL; total fuel consumption—WFE; etc.) with reference to the operating environment (altitude; ambient temperature less the standard temperature—DTAmb; Mach number—Mn; etc.). The EEC uses these data to determine the desired air system bypass flow setting and directs a valve position controller accordingly. More than one control system channel may be provided for redundancy, safety and despatch reliability. The EEC can use engine health monitoring data to adjust the bypass flow valve settings to account for deteriorating gas temperatures and shaft speeds. FIG. 5 shows schematically an overview of such a control system.

Advantageously, the air system may be retro-fitted to an existing engine, even without altering that engine's existing NGV throat area. This can then provide reduced high power temperatures and speeds, while maintaining existing cruise operating conditions.

Figure 6:
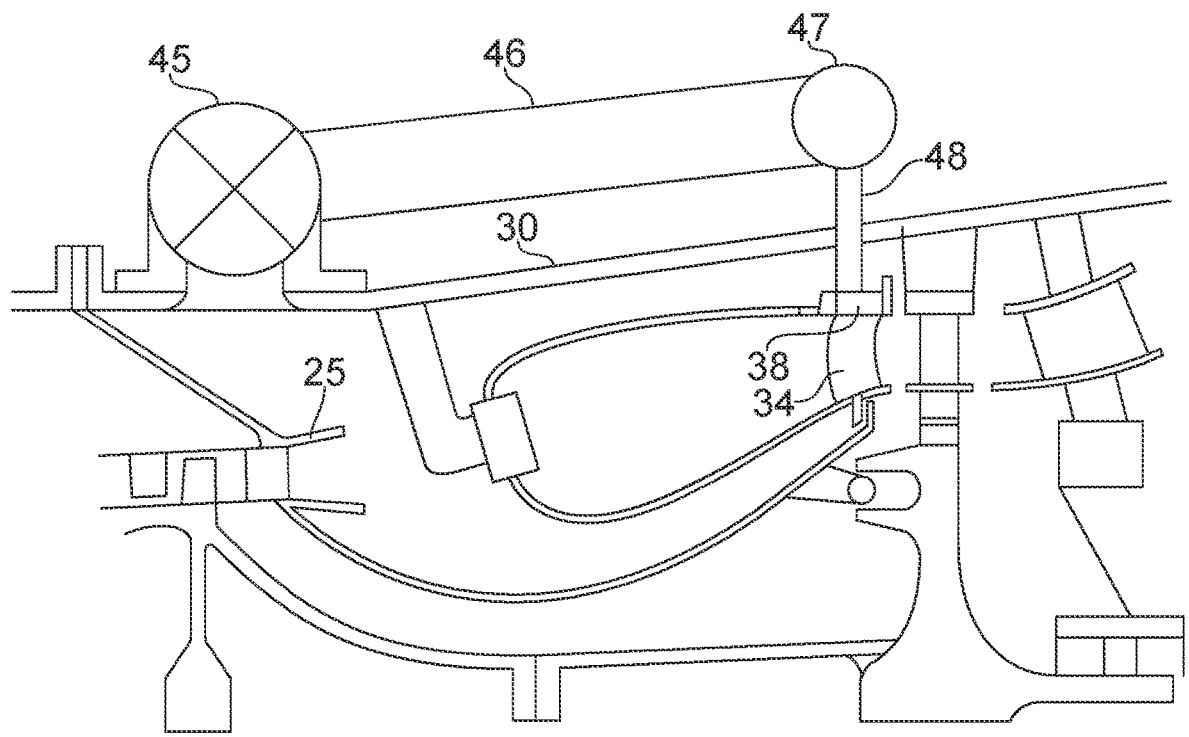
FIG. 6 shows schematically a variant of the air system of FIG. 3.

FIG. 6 shows schematically a variant of the air system in which, instead of the diversion pathway for the bypass air remaining inside the outer air casing 30, it is directed via external piping. For example, plural (e.g. two) high temperature bleed valves 45 adjacent the diffuser 25 can direct the bypass flow into external pipes 46, which in turn deliver the flow to a manifold 47, and thence, via transfer pipes 48, to the NGV plenum chambers 38. Pressure sensors may be provided inside the feed pipes. This variant can be adopted when there is insufficient space for the entire diversion pathway inside the outer air casing. However, having the diversion pathway inside the outer air casing is safer as core flow gases cannot escape the outer air casing in the event of a burst duct.

Figure 7:
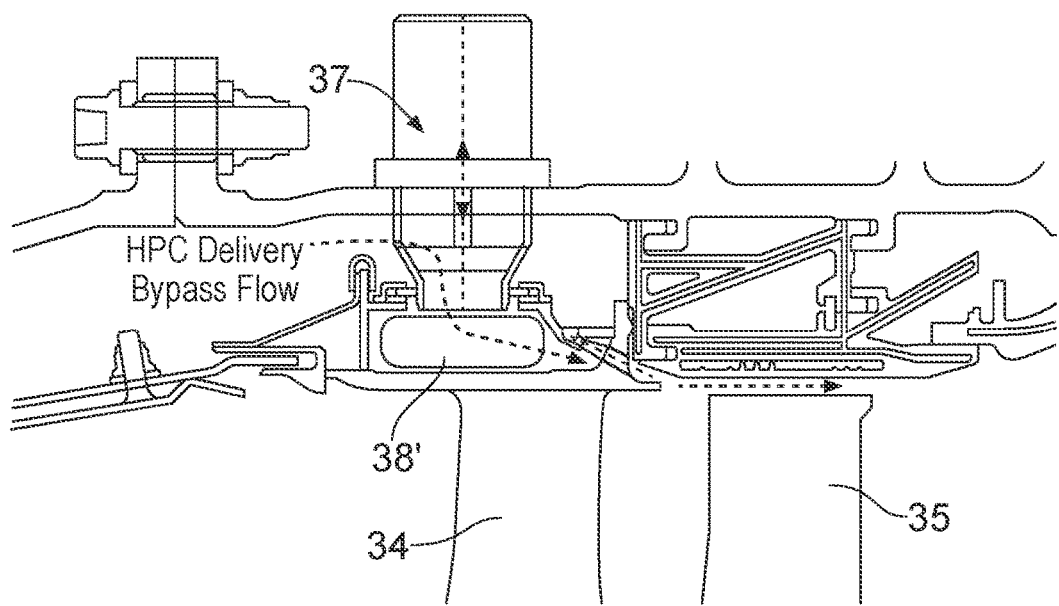
FIG. 7 shows schematically a further variant of the air system.

FIG. 7 shows schematically a further variant of the air system in which the individual plenum chambers 38' provided inside the outer platforms of the NGVs 34 are fluidly connected together to form in combination an annular plenum. This requires additional sealing features (e.g. strip seals) between the end walls of the outer platforms. However, it enables the removal of the master plenum chamber.

Figure 8:
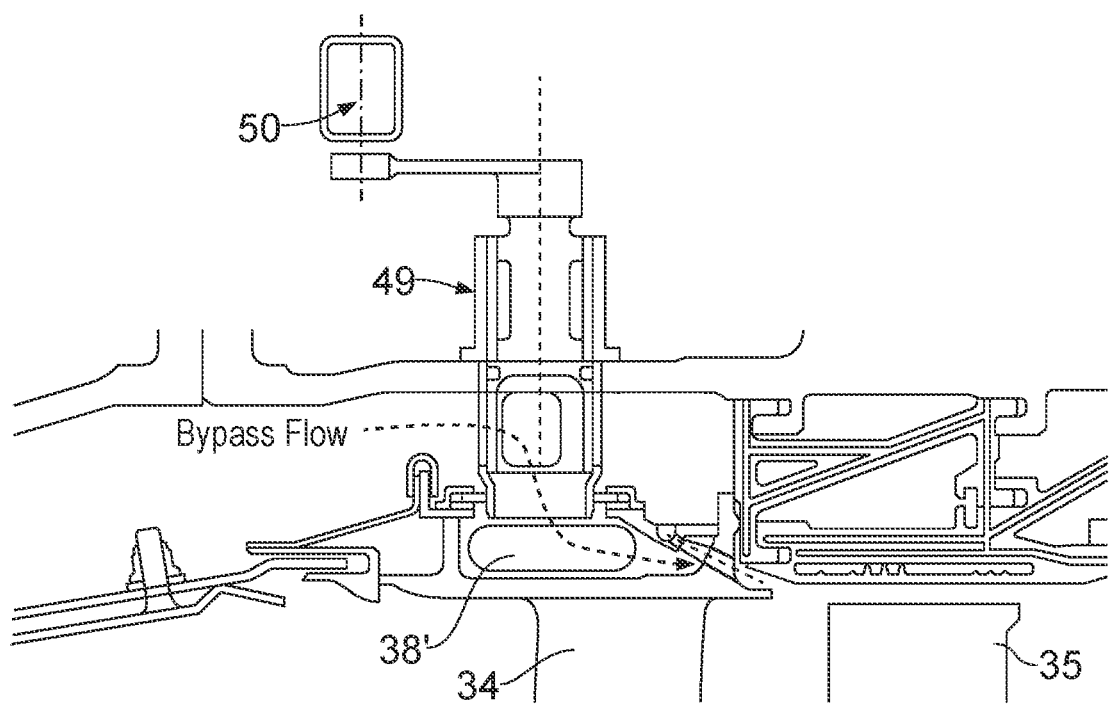
FIG. 8 shows schematically a further variant of the air system.

FIG. 8 shows schematically a further variant of the air system in which the plug valves (discretely operating) are replaced by continuously variable valves such as rotating gate valves 49. This enables a continuous variation in the bypass flow rate. Conveniently, the continuously variable valves can be operated via a unison ring 50.

Figure 9:
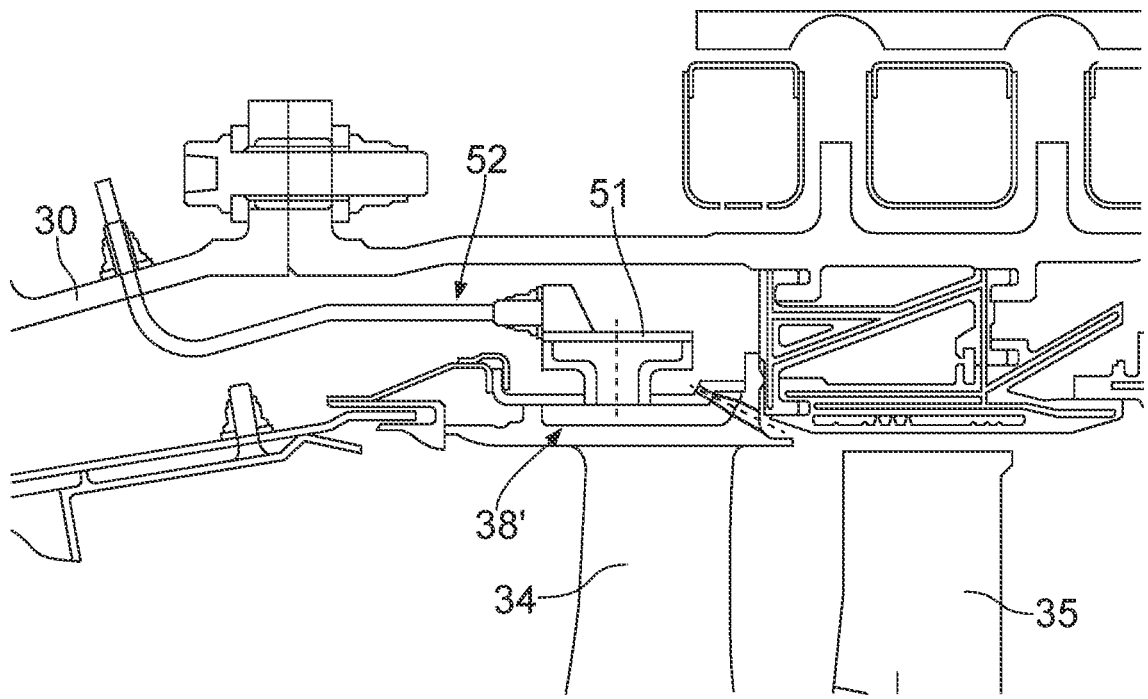
FIG. 9 shows schematically a further variant of the air system.

FIG. 9 shows schematically a further variant of the air system which replaces the mechanical valves with vortex amplifier valves 51, which can be mounted directly onto respective NGV pairs and thus control the bypass flow directly at the point of interest. Vortex amplifier valves advantageously have no moving parts and are thus very reliable. The muscle air flow for switching the vortex amplifier valves can be directed to the valves through piping 52 fitted to the outer air casing 30.

Another variant makes use of relative thermo-mechanical movement in the core engine to operate the valves of the air system. More particularly, the NGVs 34 are supported by a relatively cool and stiff outer structure and a relatively hot and flexible inner structure. Relative thermo-mechanical movement between these structures occurs as the engine transitions between low and high power operation and causes the NGVs to tilt. A passive control arrangement can be implemented that makes use of the tilting movement to open and close the diversion pathway.

An advantage of this arrangement is that the air system does not require an active control system and potentially unreliable valves to operate. However, a disadvantage is that the air system only opens at high power and cannot be operated at low power (idle) conditions.

Figure 10:
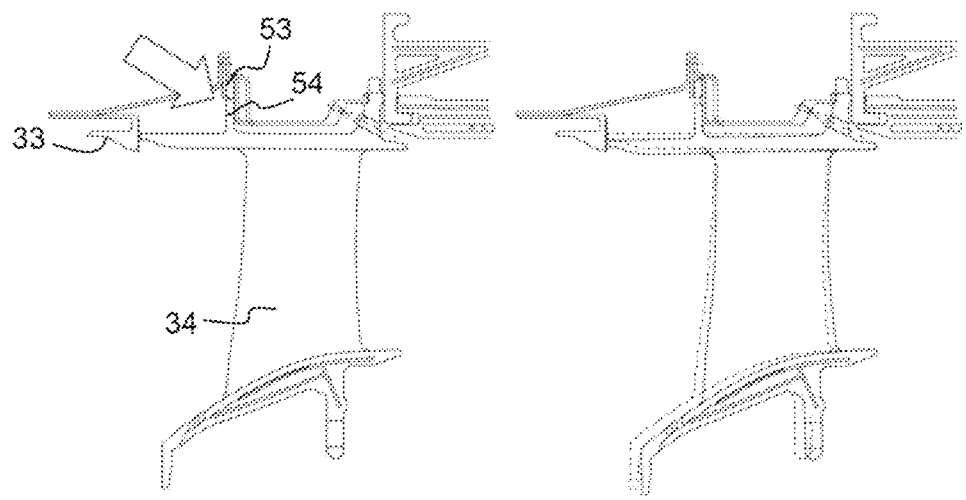
FIG. 10 shows schematically a further variant of the air system.
Figure 11:
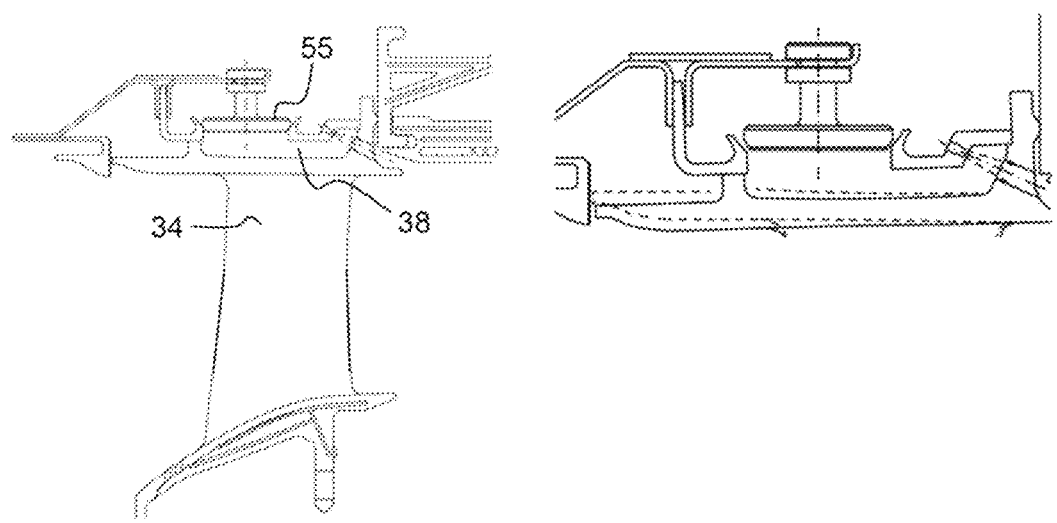
FIG. 11 shows schematically a further variant of the air system.
Figure 12:
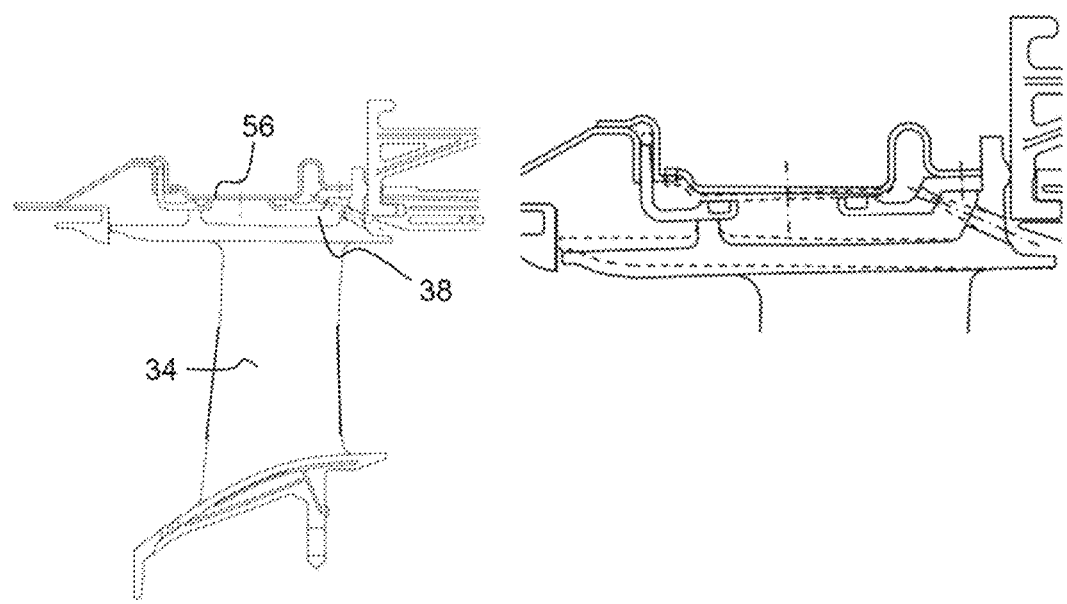
FIG. 12 shows schematically a further variant of the air system.

FIG. 10 to FIG. 12 show different possible configurations for the passively operated valves. In each case at left the valve is shown in the closed condition and at right in the open condition. At high power operation the NGV tilt is such as to rotate the NGV anticlockwise in the plane of the Figures. In FIG. 10, the valve is formed by a ring seal 53 located between the rear outer discharge nozzle 33 and front ribs 54 of the NGV outer platforms. In FIG. 11, the individual NGV plenum chambers 38 are fitted with respective plug valves 55, tilting of the NGVs causing the valves to lift from their seats. In FIG. 12, individual NGV plenum chambers 38 are fitted with flap seals 56, tilting of the NGVs causing the flap seals to unseal.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

The invention claimed is:

1. A gas turbine engine comprising:
a core engine including:
   a compressor,
   combustion equipment which receives compressed air from the compressor,
   a circumferential row of nozzle guide vanes, and
   a turbine, the nozzle guide vanes defining a throat for entry of hot working gases from the combustion equipment into the turbine; and
   an air system which is configured to be switched between:
      an on-position which opens a diversion pathway along which a portion of the compressed air exiting the compressor bypasses the combustion equipment to join the hot working gases at re-entry holes located between the nozzle guide vanes and a rotor at the front of the turbine, thereby increasing the semi-dimensional mass flow $\omega(T30)^{0.5}/(P30)$ of the core engine at the exit of the compressor, and
      an off-position which closes the diversion pathway, thereby decreasing the semi-dimensional mass flow of the core engine at the exit of the compressor, $\omega$ being the real mass flow of the compressed air exiting the compressor, T30 being the temperature of the compressed air exiting the compressor, and P30 being the pressure of the compressed air exiting the compressor;
   an engine electronic controller, wherein the engine electronic controller is configured to:
      determine a semi-dimensional mass flow of the core engine at the exit of the compressor to be achieved for a given flight condition based on engine power setting parameters; and
      control operation of the air system to the on-position or the off-position based on the determination,
      wherein the air system is configured such that, in the on-position, the portion of the compressed air is at least 2% of the total compressed air exiting the compressor.

2. The gas turbine engine according to claim 1, wherein the air system is configured such that said portion of the compressed air is at least 5% of the total compressed air exiting the compressor.

3. The gas turbine engine according to claim 1, wherein the re-entry holes are formed in an outer wall of a hot working gas annulus of the turbine.

4. The gas turbine engine according to claim 3, wherein the re-entry holes are located at trailing edges of outer platforms of the nozzle guide vanes.

5. The gas turbine engine according to claim 1, wherein the air system further has fan-shaped accelerating flow ducts for the portion of the compressed air, the re-entry holes being exit holes from the fan-shaped accelerating flow ducts.

6. The gas turbine engine according to claim 1, wherein the diversion pathway is configured such that, at the re-entry holes the portion of the compressed air is given a swirl component that matches the swirl component of the hot working gases flowing across the re-entry holes.

7. The gas turbine engine according to claim 1, wherein the air system is configured such that, in the off-position, a purge flow of air is directed through the re-entry holes to prevent hot working gas ingestion therethrough.

8. The gas turbine engine according to claim 1, wherein the core engine further includes a radially outer air casing to the combustion equipment, the diversion pathway remaining inside the air casing.

9. The gas turbine engine according to claim 1, wherein the diversion pathway passes through an annular plenum upstream of the re-entry holes.

10. The gas turbine engine according to claim 1, wherein the air system has one or more valves operable to open or close the diversion pathway.

11. The gas turbine engine according to claim 10, wherein the one or more valves are located on the diversion pathway upstream of the re-entry holes.

12. The gas turbine engine according to claim 10, wherein the diversion pathway passes through an annular plenum upstream of the re-entry holes and wherein the one or more valves are operable to permit or prevent access to the annular plenum by said portion of the compressed air.

13. The gas turbine engine according to claim 10, wherein the engine electronic controller is configured to control the one or more valves to switch the air system.

14. The gas turbine engine according to claim 13, wherein the engine electronic controller is configured to open the diversion pathway during take-off and climb operating conditions, and to close the diversion pathway during cruise operating conditions.

15. The gas turbine engine according to claim 1, wherein the air system is configured such that said portion of the compressed air is at least 6% of the total compressed air exiting the compressor.

16. A gas turbine engine comprising:
a core engine including:
- a compressor,
- combustion equipment which receives compressed air from the compressor,
- a circumferential row of nozzle guide vanes, and
- a turbine, the nozzle guide vanes defining a throat for entry of hot working gases from the combustion equipment into the turbine; and
an air system comprising one or more valves configured to open or close a diversion pathway, wherein the air system is configured to be switched between:
   an on-position in which the one or more valves are in an open position and in which the diversion pathway is open, wherein the diversion pathway defines a diversion flow path along which a portion of the compressed air exiting the compressor bypasses the combustion equipment to join the hot working gases at re-entry holes located between the nozzle guide vanes and a rotor at the front of the turbine, thereby increasing the semi-dimensional mass flow $\omega(T30)^{0.5}/(P30)$ of the core engine at the exit of the compressor, and
   an off-position in which the one or more valves are in a closed position and in which the diversion pathway is closed, thereby decreasing the semi-dimensional mass flow of the core engine at the exit of the compressor, $\omega$ being the real mass flow of the compressed air exiting the compressor, T30 being the temperature of the compressed air exiting the compressor, and P30 being the pressure of the compressed air exiting the compressor;
wherein the one or more valves are mechanically coupled to the nozzle guide vanes such that tilting of the nozzle guide vanes caused by differential thermomechanical movement between inner and outer casings of the core engine operates the valves between the closed position and the open position, and
wherein the air system is configured such that, in the on-position, the portion of the compressed air is at least 2% of the total compressed air exiting the compressor.

\* \* \* \* \*